United States Patent
Gustafsson et al.

(10) Patent No.: US 9,604,361 B2
(45) Date of Patent: Mar. 28, 2017

(54) SYSTEM AND METHOD FOR DEFINING MOTIONS OF A PLURALITY OF ROBOTS COOPERATIVELY PERFORMING A SHOW

(71) Applicant: ABB Schweiz AG, Baden (CH)

(72) Inventors: Magnus Gustafsson, Åsa (SE); Mark Ruth, Macomb, MI (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/105,423

(22) PCT Filed: Feb. 5, 2014

(86) PCT No.: PCT/EP2014/052180
§ 371 (c)(1),
(2) Date: Jun. 16, 2016

(87) PCT Pub. No.: WO2015/117641
PCT Pub. Date: Aug. 13, 2015

(65) Prior Publication Data
US 2016/0311112 A1    Oct. 27, 2016

(51) Int. Cl.
*B25J 9/16*       (2006.01)
*H04N 21/482*  (2011.01)
(Continued)

(52) U.S. Cl.
CPC .......... *B25J 9/1664* (2013.01); *B25J 9/1656* (2013.01); *B25J 9/1682* (2013.01);
(Continued)

(58) Field of Classification Search
None
See application file for complete search history.

(56) References Cited

U.S. PATENT DOCUMENTS 6,292,714 B1     9/2001   Okabayashi
6,470,235 B2 *  10/2002  Kasuga ................ G06F 8/34
                                                                 700/11
(Continued)

FOREIGN PATENT DOCUMENTS

EP            2538696 A1      12/2012

OTHER PUBLICATIONS

International Preliminary Report on Patentability Application No. PCT/EP2014/052180 Mailing Date: Jan. 14, 2016 5 pages.
(Continued)

*Primary Examiner* — Khoi Tran
*Assistant Examiner* — Ryan Rink
(74) *Attorney, Agent, or Firm* — Whitmyer IP Group LLC

(57) ABSTRACT

A system for defining motions of a plurality of real robots cooperatively performing a show based on a description of the motions of the robots defined by animation software. The system includes at least one storage for storing a plurality of segments that describe the motions of the robots during the show, each segment includes a description of motions of one of the robots during a defined time period, and for storing a plurality of scenes, each scene specifying a plurality of segments to be executed simultaneously by the robots, and a playlist handler configured to handle creation of a playlist including a sequence of scenes and to amend the playlist according to user commands, and a user interface configured to display the playlist to a user, to allow the user to edit the playlist by amending the sequence of scenes, and to receive the user commands.

12 Claims, 5 Drawing Sheets

(51) Int. Cl.
*H04N 21/41* (2011.01)
*H04N 21/414* (2011.01)
*H04N 21/845* (2011.01)
*H04N 21/8543* (2011.01)

(52) U.S. Cl.
CPC ... *H04N 21/4122* (2013.01); *H04N 21/41415* (2013.01); *H04N 21/4825* (2013.01); *H04N 21/8456* (2013.01); *H04N 21/8543* (2013.01); *G05B 2219/40395* (2013.01)

(56) References Cited

U.S. PATENT DOCUMENTS

| | | |
|---|---|---|
| 7,099,747 B2 | 8/2006 | Mikami et al. |
| 8,356,704 B2 | 1/2013 | Flessas |
| 9,333,651 B2* | 5/2016 | Maisonnier ............ B25J 9/1661 |
| 2001/0034559 A1 | 10/2001 | Brown et al. |
| 2003/0023347 A1* | 1/2003 | Konno ................... B25J 9/1671 |
| | | 700/245 |
| 2003/0045203 A1* | 3/2003 | Sabe ...................... G06N 3/008 |
| | | 446/356 |
| 2008/0082214 A1 | 4/2008 | Haskell et al. |
| 2010/0039380 A1 | 2/2010 | Lanier |
| 2013/0120547 A1 | 5/2013 | Linnell |

OTHER PUBLICATIONS

International Search Report and Written Opinion of the International Searching Authority Application No. PCT/EP2014/052180 Completed: Dec. 1, 2014; Mailing Date: Dec. 5, 2014 11 pages.

\* cited by examiner

SYSTEM AND METHOD FOR DEFINING MOTIONS OF A PLURALITY OF ROBOTS COOPERATIVELY PERFORMING A SHOW

TECHNICAL FIELD

The present invention relates to a system and a method for defining motions of a plurality of real robots cooperatively performing a show.

BACKGROUND

Robots are most often used in the industry to perform repetitive work tasks. In this case, what is important is that the task is completed correctly and reliably. How enjoyable it is to watch the robot perform the task is unimportant.

Existing practice is for a human programmer to program the robot for each task. The important robot positions related to the task may be defined by directly positioning the robot and storing the positions. The programmer then writes code which references the stored positions and instructs the robot to perform the desired task.

However, in recent years it has been popular to use robots to move entertainment elements, such as a video display, a video projector or a staircase, for the purpose of entertaining people. For example, there are a large number of robots performing together with people on a stage in a show. This can be a musical show where people and robots are on-stage, or a trade show, where robots move display panels. It can also apply to designer stores and areas where robots handle displays or scanning equipment with people. A challenge of such a system is how to build a robot program and synchronize the robot motion to a show's playlist as well as to actions on the stage or both.

U.S. Pat. No. 8,356,704 discloses a robotically controlled entertainment element, such as a video display, a video projector or a staircase. A robot moves the entertainment element in three dimensions.

Programming a robot for the purposes of entertaining spectators is qualitatively different in many ways from programming robots in the industry. The robots typically have a well-defined set of specific move sequences designed for visual appeal. There is no requirement for intelligent decision making on the part of the robot and the focus is entirely on appearance. Programming the robot to make natural, "organic" looking movements using traditional programming methods is at best very difficult and time-consuming; at worst, nearly impossible.

Because of the absence of decision-making in the program and the focus on visual appeal, the programming of robot motion for entertaining performances has more in common with computer animation than with traditional robotics programming. The ideal solution, then, is to define the robot performance in exactly the same way that a computer animator would define an animation of the robot performance.

It is known to use existing 3D computer animation software and existing computer animation talent to create a robot animation sequence. A computer animator uses the computer animation software to animate a model of the real robot within the physical limitations of the real robot. A robot program is then created from the animation in such a way that the motions of the real robot exactly match the motions of the animated robot.

Today, show designers use external 3D animation tools, such as MAYA, to design the robot motion together with the human motions and possible music synchronization in a show or trade show. The show designer designs the robot motions in advance in a studio far away from the place where the show is to be performed and using software models of the robots. When the show is to be performed with real robots on a real stage, with real people acting in the show, it often happens that the motions of the robot need to be changed in order to fit with the real environment and other circumstances, which were not foreseen during creation of the robot animation sequence. Thus, there is a need to edit the motions of the robots after the animation and the robot program code have been created. In particular, there is a need to edit the robot motions onsite together with the real robots, for example, during rehearsal of the show. For example, there is a need to change the sequence of robot motions. However, the motions of the robots were synchronized in time during the creation of the robot animation sequence. Thus, when changing the sequence of robot motions there is a risk for collisions between the robots.

SUMMARY

It is an object of the present invention to provide a solution to the above mentioned problem with regard to editing the sequence of robot motions defined by the computer animation software.

According to one aspect of the invention, this object is achieved by a system as defined by the independent claims.

The system comprises at least one storage for storing a plurality of segments that describe the motions of the robots during the show, each segment includes a description of motions of one of the robots during a defined time period, and for storing a plurality of scenes, each scene specifying a plurality of segments to be executed simultaneously by the robots, and a playlist handler configured to handle creation of a playlist including a sequence of scenes and to amend the playlist according to user commands, and a user interface configured to display the playlist to a user, to allow the user to edit the playlist by amending the sequence of scenes, and to receive the user commands.

The motions defined for the robots to be carried out during the show are divided into a plurality of scenes. The motions for each robot are divided into a plurality of consecutive segments. Each segment defines a motion to be carried out by a certain robot during a defined time period. The defined time period only specifies the duration of the motions to be carried out, and does not specify when the segment is to be carried out during the show. For each scene there are a number of corresponding segments including motions to be carried out simultaneously by the robots. The number of segments to be carried out simultaneously is the same as the number of robots. Accordingly, the number of segments in each scene is equal to the number of robots to be programmed. Each scene includes information on which segments belong to the scene.

According to the invention, the system obtains a plurality of scenes, each scene including a plurality of segments to be executed simultaneously by the robots. A scene includes all segments including motions to be carried out simultaneously by the robots. A playlist handler is configured to handle creation of a playlist including a sequence of scenes defining a sequence of robot motions during the show. The system includes a user interface configured to display the playlist to a user, to allow the user to edit the playlist by amending the sequence of scenes, and to receive user commands regarding the amendments. The playlist handler is configured to amend the playlist, and accordingly the sequence of scenes, based on the user commands. Thus, it is possible for the user to change the sequence of scenes, i.e. to move, add and/or delete an entire scene. Since the robot motions within a scene was coordinated with each other and checked for collisions when the robot animation sequence was created, the user can edit the sequence of scenes without the risk for collisions between the robots due to the amendments. The present invention allows a user to edit the sequence of robot motions defined by the computer animation software, before the robot programs are distributed to the respective robot controllers.

According to an embodiment of the invention, the system comprises a segment storage for storing a plurality of segments that describe the motions of the robots during the show, each segment including a description of motions of one of the robots.

According to an embodiment of the invention, the system comprises a scene storage for storing the scenes, and a scene handler configured to create a plurality of scenes based on the stored segments, and to store the scenes in the scene storage.

According to an embodiment of the invention, the playlist handler is configured to receive a user command regarding an amendment in a part of the sequence of scenes, to validate the amendment based on the description of the motions of the robots of the segments included in the scenes in the amended part of the playlist, and allow or deny the amendment based on the outcome of the validation. The positions of a robot in one scene puts limitations on which positions the robot can be moved to in the next scene. This embodiment validates, i.e. carries out a check, whether or not a suggested amendment of the robot motions is possible to carry out, i.e. whether it is possible for the robots to perform the new sequence of motions. If the suggested amendment is not possible to carry out, the amendment is denied. This embodiment prevents the user from amending the sequence of motions in such way that the robot cannot perform the motions.

According to an embodiment of the invention, the description of the motions of the robots comprises positions of the robot, and the playlist handler is configured to compare positions belonging to the same robot of neighboring scenes in the amended part of the playlist and to validate the amendment based on the outcome of the comparison. The position can, for example, be described as Cartesian positions or as joint values.

According to an embodiment of the invention, each segment includes a start position and an end position for the robot, and the playlist handler is configured to validate an amendment by comparing start and end positions of segments belonging to the same robot of neighboring scenes in the amended part of the playlist, and to deny the amendment if the difference between the start and end positions of any of the segments of adjacent scenes exceeds a limit value. An amendment is not allowed if the difference between the end position of one segment of a scene and the start position of the segment belonging to the same robot of the next scene exceeds a limit value. By this embodiment the user is prevented from amending the sequence of motions so that the robots cannot carry out the motions.

For example, the description includes a plurality of joint values for the axes of the robot, and the playlist handler is configured to compare the joint values for the axes of segments belonging to the same robot of neighboring scenes in the amended part of the playlist.

According to an embodiment of the invention, each of the segments comprises information on which scene the segment belongs to, and the scene handler is configured to group the segments into a plurality of scenes based thereon. The fact that each segment is provided with information on which scene it belongs to facilitates for the scene handler to create the scenes.

According to an embodiment of the invention, each of the segments comprises a robot identification tag including information on which robot the segment belongs to, and the playlist handler is configured to determine to which robot a segment belongs based on the robot identification tag. This information is, for example, used for validation of amendments of the robot motions, for creating main programs for each robot, and for distributing the main the main programs to the correct robot.

According to an embodiment of the invention, the playlist handler and the user interface are configured to allow the user to edit the segments of the scenes in the playlist. The segments of a selected scene can be edited. For example, new segments can be added, existing segments from a library can be added, segments can be removed from the playlist and the order of the segments can be changed.

However, when the segments are changed, there a risk for collisions between the robots may arise. According to an embodiment of the invention, the playlist handler is configured to simulate the motions of the robots based on the playlist, the stored scenes, and stored segments, and to validate the playlist based on the simulation. This embodiment validates the sequence of robot motions defined by the playlist to avoid collisions and errors due to changes in the segments.

According to an embodiment of the invention, each segment further includes program code for carrying out the motion of the robot during the defined time period, and the system further comprises a program generator configured to generate a main program for each of the robots based on the playlist, the stored scenes and the robot code of the stored segments. This embodiment enables automatic generation of robot programs for each of the robots to carry out individual movements based on sequence of robot motions defined by computer animation software, and a playlist created by a user.

According to an embodiment of the invention, each segment includes a subroutine including the robot code and having a subroutine name to be called by the main programs, and the program generator is configured to generate a main program for each of the robots including a sequence of calls to the subroutines based on the playlist. The main programs do not include any robot code for carrying out the movements. Thus, the segments including the robot code for carrying out the movements can be loaded to the robot controller separate from the main program. It is often time consuming to load the robot code to the robot controllers. In this embodiment, the robot code only has to be loaded once to the robot controller. Due to the fact that the robot program includes a sequence of calls to the subroutines including the robot code, it is easy and fast to load the robot program to the robot controller. If the sequence of robot motions has to be amended later, it is easy to amend the sequence of subroutine calls in the main program and fast to load the new main program to the robot controller. The robot code does not have to be amended. This embodiment simplifies amendments to the robot program after the robot code has been loaded to the robot controller.

According to an embodiment of the invention, the system is adapted to automatically distribute the main programs and the segments to each of the robots so that each robot receives an associated main program and the segments belonging to the robot. The editing of the sequence of scenes and the generation of main programs for the robots are preferably made off-line in a computer separate from the robot controllers. This embodiment enables automatic distribution of the main programs and the segments including the program code to each of the robots.

According to another aspect of the invention, this object is achieved by a method for defining motions of a plurality of real robots cooperatively performing a show based on a description of the motions of the robots during the show as defined by animation software.

The method comprises:
- obtaining a plurality of segments that describe motions of the robots defined by an animation software, each segment including a description of the motions of one of the robots during a defined time period,
- storing the segments,
- obtaining a plurality of scenes, each scene including a plurality of segments to be executed simultaneously by the robots,
- storing information about the scenes,
- creating a playlist including a sequence of scenes,
- displaying the playlist to a user and allow the user to edit the playlist by amending the sequence of scenes,
- receiving user commands regarding amendments,
- amend the playlist based on the user commands, and
- storing the amended playlist.

The plurality of segments can be obtained by receiving or retrieving the segments from a motion producing module including a robot animator. The plurality of scenes can be obtained by receiving or retrieving the scenes from the motion producing module, or by creating the scenes based on the stored segments.

According to an embodiment of the invention, the method comprises:
- receiving a user command regarding an amendment in a part of the sequence of scenes,
- validating the amendment based on the description of the motions of the robots of the segments included in the scenes in the amended part of the playlist, and allowing or denying the amendment based on the outcome of the validation and amend the playlist if the amendment is allowed.

According to an embodiment of the invention, the description of the motions of the robots includes a plurality of positions of the robot, and the method includes comparing at least some of the positions belonging to the same robot of neighboring scenes in the amended part of the playlist and validating the amendment based on the outcome of the comparison.

According to an embodiment of the invention, each segment includes a start position and an end position for the robot, and the method comprises comparing start and end positions of segments belonging to the same robot of neighboring scenes in the amended part of the playlist, and denying the amendment if the difference between the start and end positions of any of the segments of adjacent scenes exceeds a limit value.

According to an embodiment of the invention, the method comprises receiving a plurality of the segments, storing the segments, creating a plurality of scenes based on the stored segments, and storing the scenes.

According to an embodiment of the invention, each of the segments comprises information on which scene the segment belongs to, and the plurality of scenes are created based on the information on which scene the segment belongs to.

According to an embodiment of the invention each of the segments comprises a robot identification tag including information on which robot the segment belongs to, and the method comprises determining to which robot a segment belongs based on the robot identification tag.

According to an embodiment of the invention, the method further includes simulating the motions of the robots based on the playlist, the stored scenes, and stored segments, and validating the playlist based on the simulation.

According to an embodiment of the invention, each segment further includes program code for carrying out the motions of the robot during the defined time period, and the method further comprises generating a main program for each of the robots based on the playlist, the stored scenes and the robot code of the stored segments.

According to an embodiment of the invention, each segment includes a subroutine including the robot code and a subroutine name for calling the robot code of the segment, and the method comprises generate a main program for each of the robots including a sequence of calls to the subroutines based on the playlist.

According to an embodiment of the invention, the method comprises automatically distributing the main programs and segments to each of the robots so that each robot receives an associated main program and the segments belonging to the robot.

BRIEF DESCRIPTION OF THE DRAWINGS

The invention will now be explained more closely by the description of different embodiments of the invention and with reference to the appended figures.

DETAILED DESCRIPTION

Figure 1:
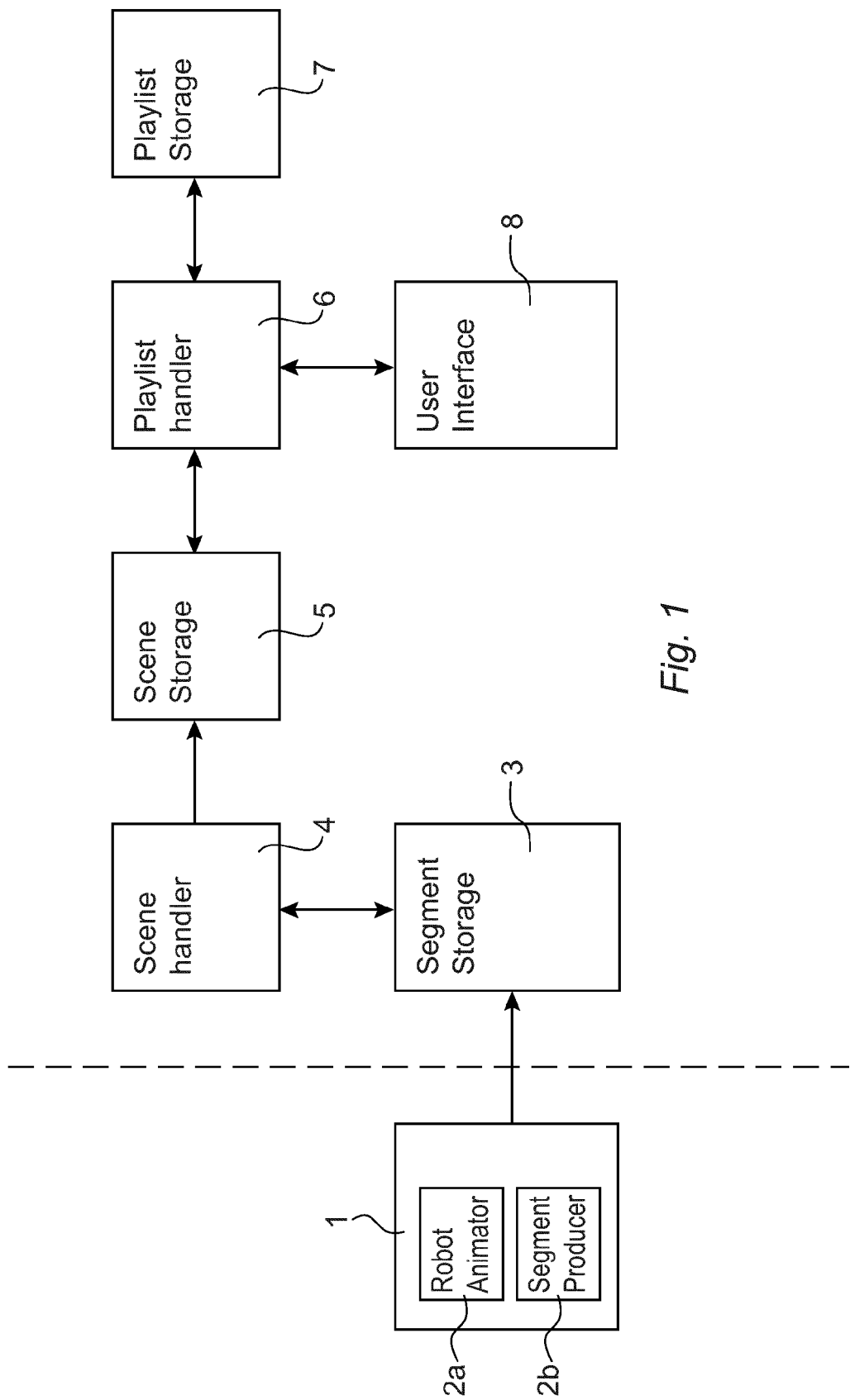
FIG. 1 shows a block scheme of a system for editing and validating motions of a plurality of robots cooperatively performing a show according to an embodiment of the invention.

FIG. 1 shows a block scheme of an example of a system for editing and validating motions of a plurality of robots cooperatively performing a show according to the invention.

The motions of the robots are predefined by a motion producing module 1 comprising a robot animation module 2a and a segment producer module 2b adapted to produce segments based on a description of the motions of the robots defined by the robot animation module 2. The robot animation module 2a and the segment producer module 2b are not part of the system of the present invention.

The robot animation module 2a includes animation software for animating the robots based on one or more robot models. The segment producer module 2b is a computer program adapted to analyze the animation of the robot models and to automatically generate robot program code that instructs the real robots to reproduce the motion of the animated robot. The segment producer module 2b and robot animation module 2a are run on a computer. The computer program achieves this by providing a means of associating rotational components of the animated robot model with axes on the real robot, and a means of generating the robot program code from the finished animation. Once the rotational components are associated with the axes on the real robot and the robot model is animated, the program generates the robot program code by working in two phases: analysis and synthesis. The analysis phase determines the motion of the robot in the animation. The synthesis phase then uses the information resulting from the analysis phase to generate robot program code that instructs the real robots to move in the same way.

In the analysis phase, the computer program analyzes the rotational components of the computer animation model that relate to the rotations of the axes on the real robot. It analyzes these rotations throughout the period of the animation and determines a path for each axis. It determines this path by detecting linear changes in the rotation values and locating the key positions at which the rotational motion changes. It then combines the motion paths for the individual axes into a set of key positions for the entire robot. Each position includes a rotational value for each axis and a time value for the position. This set of key positions completely and unambiguously describes the motion of the robot as defined by the animation software in a form that can be used to subsequently generate a program to instruct the real robot to move the same way.

In the synthesis phase, the computer program steps through the set of key positions determined by the analysis phase, and generates instructions in the robot's programming language. The resulting program code instructs the robot to arrive at each correct position at the correct time. This is achieved by generating each move instruction to be executed when the robot arrives at the previous position and calculating the exact speed required for the move instruction to have the robot finish moving and arriving at the key position at the exact time associated with that position. The result is that the movement of the robot through the key positions exactly matches the movement of the animated robot. Alternatively, the time for each movement is saved for use in those robot languages that can move between targets not only with specified speeds, but with specified times.

The segment producer module 2b is configured to produce a plurality of segments including all information needed for the robots to perform the defined motions. Each segment defines a motion to be carried out by a certain robot during a defined time period. The defined time period only specifies the duration of the motions to be carried out, for example, 10 minutes or 30 seconds. The defined time period does not specify when the segment is to be carried out during the show. The sequences of motions to be carried out by each robot are divided into a plurality of consecutive segments. For each segment there are a number of corresponding segments including motions to be carried out simultaneously by the other robots. The number of segments to be carried out simultaneously is equal to the number of robots performing in the show.

Each segment includes a description of the motions of the robot to be performed during a defined time period of the show. The description includes the time period and the positions of the robot during the time period. For example, the positions of the robot may include a sequence of angular positions for the axes of the robot. Alternatively, the positions of the robot may include a sequence of Cartesian positions for the robot. Each segment may include a start position for the robot, a plurality of intermediate positions, and an end position of the robot.

Further, each segment includes information on which robot the segment belongs to. For example, each segment includes a robot identification tag with information on the robot id. In this embodiment, there is only one segment per robot per scene. Each segment should also include information to make it possible to identify to which scene the segment belongs. For example, each segment may include a scene identification tag identifying the scene to which the segment belongs. In one embodiment of the invention, each segment also comprises robot program code including instructions for carrying out the motions of the robot during the defined time period of the segment. For example, each segment includes a subroutine including robot code and a unique name for calling the subroutine. Preferably, each segment has been assigned a unique name.

One embodiment of a system according to the invention, includes a segment storage 3 for storing the segments produced by the segment producer module 2b, a scene handler 4 configured to create a plurality of scenes based on the stored segments, a scene storage 5 for storing the scenes, a playlist handler 6 configured to create a playlist including a sequence of scenes, a playlist storage 7 for storing the playlist, and a user interface 8 configured to display the playlist to a user, to allow the user to edit the playlist by amending the sequence of scenes, and to receive user commands regarding amendments. The system is suitably implemented on a computer. The segment storage 3, scene storage 5, and playlist storage 7 can be any type of memory, such as RAM, ROM, and PROM, conventionally used in computers. They can be implemented as separate data storages, or be parts of a common memory. The scene handler 4 and playlist handler 6 can be implemented as software modules run on a computer including data processor means, such as a central processing unit (CPU). The system may include a separate computer, or may use the same computer as the segment producer module 2b and the robot animation module 2. The user interface 8 can, for example, be implemented by a display screen and any traditional user input means such as a key pad, a data mouse or a touch screen.

The scene handler 4 is configured to group the segments into a plurality of scenes. A scene includes all segments to be executed simultaneously by the robots. Thus, the number of segments in each scene is the same as the number of robots performing in the show. For example, the scene handler 4 uses the scene identification tags of the segments to determine which segments belong to which scenes. For each scene, it is determined which segments belong to the scene. The scene handler 4 stores the scenes into the scene storage 5. Each of the stored scenes includes information on which segments belong to the scene. The scenes may include the segments itself, or links/addresses to the segments in the segment storage.

In one embodiment, the scene storage 5 includes a plurality of arrays representing the scenes, in the following named scene arrays. Each scene array corresponds to a scene and includes a plurality of indexes pointing out the segments in the segment storage, which belong to the scene. For example, the scene array is a two-dimensional array where the first index is a scene index, for example the scene identification tag, and the second index is a segment index.

The number of segment indexes in each scene array is the same as the number of robots in the show.

The playlist handler 6 is configured to create and store a playlist including a sequence of scenes. Suitably, the scene identification tags include information on the order of the scenes. For example, the scene information tags include numbers identifying the order of the scenes. In one embodiment, the playlist handler 6 retrieves information about the scenes from the scene storage 5 and creates a default playlist including a sequence of scenes based on the scene identification tags. Information about the playlist is stored in the playlist storage 7. In one embodiment, the playlist is an array including a plurality of indexes pointing out the scene arrays corresponding to the scenes in the scene storage 5. In the following, the array is named a playlist array.

Figure 2:
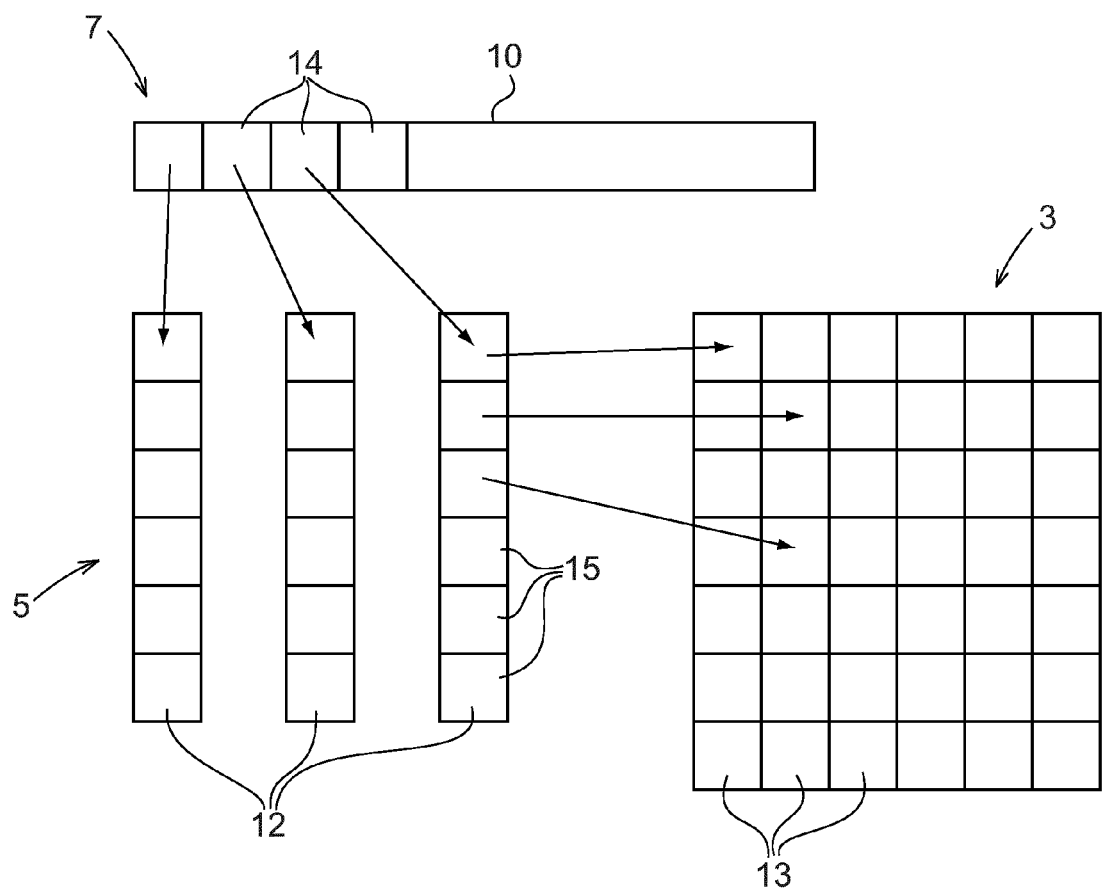
FIG. 2 shows an example of a structure for storing a playlist, scenes and segments.

FIG. 2 shows an example of a structure for storing a playlist, scenes, and segments. The segments 13 are stored in a segment storage 3. The scenes are stored in a scene storage 5 including a plurality of scene arrays 12. The number of scene arrays 12 is the same as the number of stored scenes. Each scene array 12 includes a plurality of indexes 15 pointing out the segments 13 in the segment storage 3, which belong to the scene. The number of indexes 15 in each scene array 12 is the same as the number of robots in the show. In the example shown in FIG. 2, the number of robots is six and accordingly each scene array 12 points out six segments in the segment storage 3. The playlist is stored in playlist storage 7 including at least one playlist array 10 comprising a plurality of indexes 14 pointing out scene arrays 12 corresponding to the scenes in the playlist. The playlist storage may include a plurality of playlist arrays corresponding to different playlists. This structure is advantageous since it simplifies amendment of the playlist, and facilitates the loading of data and program code to each robot. However, it is possible to use other structures for storing the playlist, scenes and segments. In one embodiment, the segments can be stored together with the scenes in a common storage.

The playlist handler 6 is configured to display the playlist on the user interface 8. The user interface is designed to display the playlist and to allow a user to edit the playlist. The user is allowed to edit the playlist displayed on the user interface, for example, to change the order of the scenes, delete scenes, and add new scenes to the playlist. However, the user is not allowed to amend the individual segments. The user interface 8 is configured to generate and send commands to the playlist handler 6 based on input from the user regarding amendments to the playlist. The playlist handler 6 is configured to receive commands from the user interface 8 regarding amendments to the playlist issued by the user, and to amend the playlist based on the commands. The amended playlist is displayed on the user interface 8. Suitably, the playlist handler 6 is configured to store more than one playlists, and to allow the user to select which of the stored playlists to be displayed and edited.

However, if the robot is moved to a certain position in one scene, there are limitations to which motions the robot can carry out in the next scene. For example, if the robot is moved to a certain position in one scene, the motion in the next scene must begin close to the last position in the previous scene. If the angular position for any of the axes of the robot differs too much between the end position in one scene and the start position in the next scene, it can be impossible to move the robot from one scene to the next scene. Thus, the positions of the axes of the robot in one scene put limitations on the positions to which the axes of the robot can be moved in the next scene. In one embodiment of the invention, the playlist handler 6 is configured to validate the amendments before they are carried out. Upon receiving a command regarding an amendment of the sequence of scenes in the playlist, the playlist handler 6 is configured to, for each robot compare at least some of the positions included in the segments for neighboring scenes in the amended part of the playlist and to validate the amendment based on the outcome of the comparison. For example, the playlist handler is configured to validate an amendment by comparing start and end positions of segments belonging to the same robot of neighboring scenes in the amended part of the playlist, and to deny the amendment if the difference between the start and end positions of any of the segments of adjacent scenes exceeds a limit value. For example, to pass the validation, the last joint value in the previous segment must be equal or very close to the first joint values in the succeeding segment.

For instance, if a scene is to be removed from the playlist, the playlist handler compares for each robot the end position of the segment in the previous scene with the start position of the segment in the next scene in the new sequence of scenes. The playlist handler allows the amendment if the difference between the start and end positions of the segments of adjacent scenes for all of the robots are less than a limit value. The playlist handler denies the amendment if the difference between the start and end positions of adjacent scenes in the new sequence of scenes for any of the robots exceeds the limit value. If the positions are joint angles for the axis of the robot, the end joint angles of the segment in the previous scene are compared with the corresponding start joint angles of the segment in the next scene for each robot.

Optionally, the playlist handler may include a simulation unit configured to simulate the motions of the robots based on the playlist, the stored scenes and segments, and the playlist handler is configured to validate the playlist based on the simulation. When the user has finished editing the playlist, the playlist handler as a final step simulates the scenes in the order determined by the playlist and checks so that there are no collisions between the robots. If the playlist handler detects a collision between any of the robots, a warning is displayed to the user.

When the user has finished editing the playlist, the playlist has been validated and no collisions were found, robot programs for the robots have to be generated.

Figure 3:
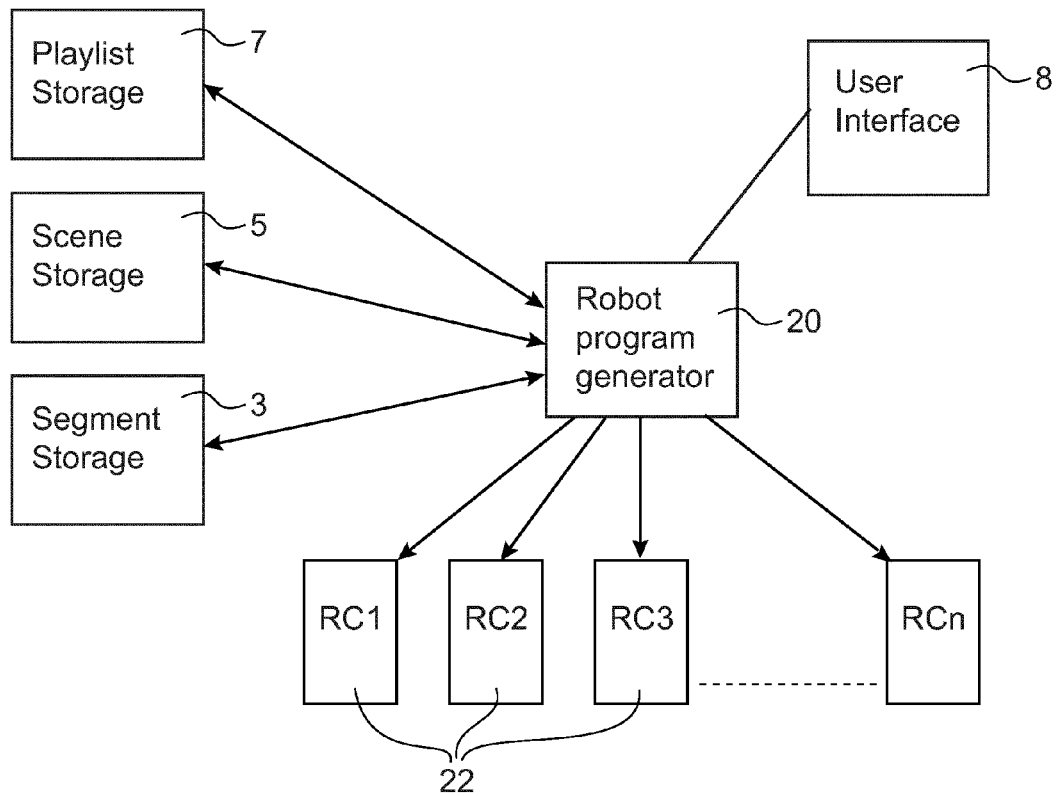
FIG. 3 shows a block scheme of a system for generating main programs for a plurality of robots cooperatively performing a show according to an embodiment of the invention.

FIG. 3 shows a block scheme of a system for generating main programs for a plurality of robots cooperatively performing a show according to an embodiment of the invention. In this embodiment, each segment includes program code for carrying out the defined motion of the robot during the defined time period. The robot code of each segment includes a subroutine that has a name to be called from the main program. The subroutine includes program instructions for instructing the robot to perform the motions defined for the segment, i.e. the motions defined by the animation software. The system comprises a program generator 20 configured to generate a main program for each of the robots based on the playlist, the stored scenes and segments. In this embodiment, each robot has a robot controller 22 including hardware and software for executing the main programs for the robot. The robot controllers are denoted RC1-RCn in FIG. 3. The user interface is arranged to allow the user to order generation of main programs based on a selected playlist and to order loading of the main programs to respective robot controllers.

The program generator 20 is configured to generate a main program for each of the robots. Each main program includes a sequence of names of subroutines to be called during execution of the main program. The sequence of names of subroutines is determined by the sequence of scenes in the playlist. For example, the generation of a main program for a robot is carried out by retrieving the names of the subroutines in the segments corresponding to the robot for each scene in the playlist. The program generator 20 is also configured to generate a segment file for each robot including all segments belonging to the robot or at least information from the segments. The segment files include the positions of the robot and the program code. The system is adapted to automatically distribute the main programs and the segment files including the segments to the respective robot controller, so that each robot receives a main program and the segments belonging to the robot. This embodiment facilitates further amendments of the playlist. Loading of the segment files is time consuming due to the large sizes of the files. In this embodiment, loading of the segment file only has to be done once. If the user amends the playlist, only the main programs have to be reloaded to the robot controllers and optionally, the new added segments.

Before the playlist is committed to the robots, a compatibility check can be made. If the playlist isn't compatible, the download is stopped. This function does a compatibility check that the segments are compatible with each other, for example, that the last joint value in the previous segment is equal to the first joint values in the succeeding segment. If the playlist isn't compatible, the following message box may pop up: "The segments in the playlist are not compatible" If the segments are Ok, the following dialog is shown: "The playlist is ok".

Figure 4:
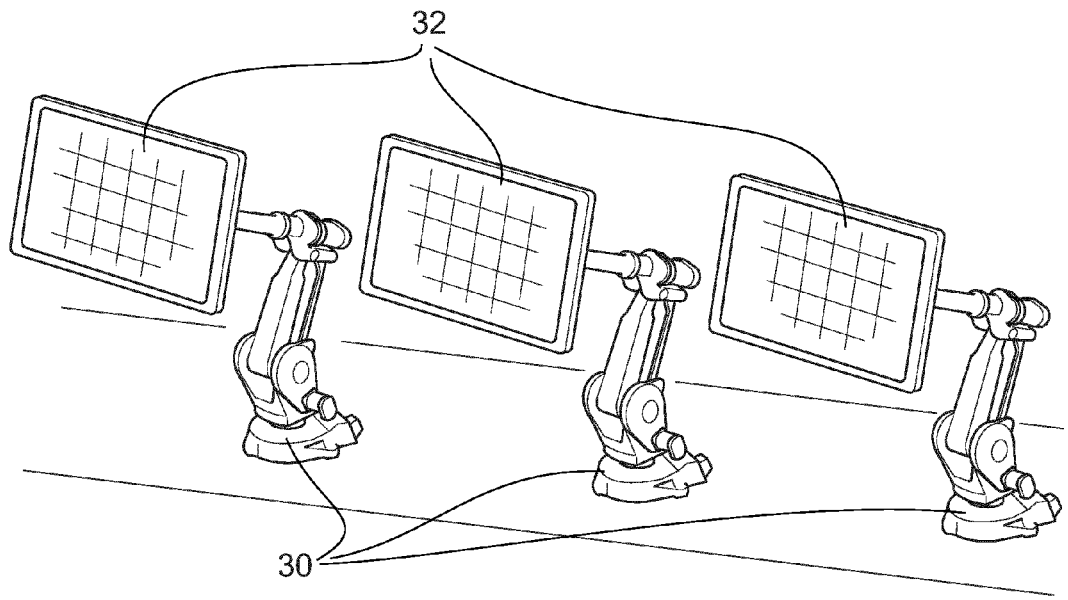
FIG. 4 shows a plurality of display handling robots cooperatively performing a show.

FIG. 4 shows an example of display handling robots 30 holding displays 32 and cooperatively performing a show.

In the following an example of the system and method according to the invention will be described in more details. The basic idea of the system is to create a playlist of scenes that will be sent down to the robot controller. Each scene contains segments. The segments originate from a 'Robot-Animator' addin in Maya. This addin generates a module written in robot code, for example a RAPID module, which contains the movement for a specific segment. The movement is discretized into absolute joint movement with a time factor, since each segment movement should be carried out in specific time. These are the fundamentals of the playlist handler:

One 'Playlist' is downloaded to the controller
The 'Playlist' contains 1-N 'Scenes'
The 'Scene' contains 1-M 'Segment', M is the number of robots.
The 'Segment' contains:
absolute path to RAPID module on disc,
Name of RAPID subroutine call (subroutine to be executed in controller), and
Segment time, i.e. the duration of the motion contained in the segment
There is only one segment per robot per scene.

By clicking a button in a user interface, a dialog is shown where it is possible to edit the playlists, scenes, and segments. The user can create a new playlist and modify an existing playlist. By selecting a 'Playlist' the containing scenes are shown. By selecting a 'Scene', the segments of the scene are shown. The playlist information is stored in the Playlist handlerLibrary.xml file located in the same folder as the Playlist handler.exe. The scenes can be used in several playlists. The segments can be used in several scenes. The user can add and remove playlists. The scenes of a playlist can be edited; new scenes can be added, existing scene from the library can be added, scenes can be removed from the playlist and the order of the scenes can be changed. The user can elect from the library of already defined scenes. The segments of a selected scene can be edited; new segments can be added, existing segments from the library can be added, segments can be removed from the playlist and the order of the segments can be changed.

After the user has closed the 'Add Segments', the application does a compatibility check that the segments are compatible with each other, if not the following message box pops up: "The segment can not be added because the joint values differs too much between the previous segment and this segment".

All available playlists in the library are shown, and the user selects which playlist to be downloaded to the robot controllers by selecting the playlist. This will download the selected playlist to the robot controllers and overwrite the existing one. Before downloading the playlist, it is advisable to ensure that the playlist is simulated and that the playlist didn't cause any collisions or errors.

After the user has created the playlist and committed it to the robot controller, information is written down to RAPID variables in a RAPID program module, here named 'DataModule', and the segment modules are loaded into each robot controller. When the operator then executes the next scene of the show, the main module will traverse the arrays in the 'DataModule' and call the subroutine name that is present in that array index.

The playlist handler is working against a playlist storage file. This file contains a description of all playlists, scenes and segments and is used as a library of existing items to be used in new playlist configurations. When the user selects a playlist to be downloaded to the controller, information about the playlist is retrieved from this storage.

The 'DataModule' file contains the playlist information, this file is updated by the playlist handler when a new playlist is committed to the controller. The file is read by an operator interface, to display the correct information to the operator.

The playlist array contains the scenes, the scene array is two-dimensional array where the first index is a scene index and the second index is the segment index for that scene. There is also a segment time array that contains the robots execution time for each segment. The segment time array has the same size as the scene array.

The following sequence is used when the user commits a new playlist:

1. The playlist handler set the variable 'NumberOfScenes'
2. The playlist handler clears the playlist array by setting "NULL" to each component. Then the scene names are added to the array. If there are two scenes (named S1 and S2), the playlist array will have the following components: ["S1", "S2", "NULL", "NULL", . . . ]
3. The playlist handler clears the scene array by setting "NULL" to each component. Then the segment names of the scene are added to the array. If there are two scenes (where the first scene has segment Seg1 and Seg2 and the next scene has segment Seg3 and Seg4), the scene array will have the following components: ["Seg1", "Seg2", "NULL", "NULL", . . . ], ["Seg3", "Seg4", "NULL", "NULL", . . . ], ["NULL", "NULL", . . . ], ["NULL", "NULL", . . . ], . . . .
4. Playlist handler set all components in 'SegmentTimes' to −1 first, and then updates the components with the correct time. The same example as above where Seg1 takes 19 s, Seg2 takes 5.7, Seg3 take 130.7 s and Seg4 takes 4.6 s, will result in the following array: [19, 5.7, −1, −1, . . . ], [130.7, 4.6, −1, −1, . . . ], [−1, −1, . . . ], [−1, −, . . . ], . . . .

Here is an example of the 'DataModule' file of the example above:

```
CONST num MAX_SCENES:=20;
CONST num MAX_SEGMENTS:=10;
CONST num joint_tolerance:=0.5;
PERS jointtarget current_joint_pos:=[[0,−49.545,−120,0,79.54,0],[9E+09,9E+09,9E+09,9E+09,9E+09,9E+09]];
PERS jointtarget home_joint_pos:=[[0.000000e,−58.000000,58.000000,0.000000,−90.000000,−90.000000],[9E9.,9E9,
PERS bool PlaySingleScene:=FALSE;
PERS tooldata screenTool:=[TRUE,[[0,0,1],[1,0,0,0]],[500,[0,0,1],[1,0,0,0],0,0,0]];
PERS num SpeedFactor:=0.970299;
PERS string sCurrectPath:="S1";
PERS num nCurrentScene;=1;
PERS num nCurrentSegment:=1;
PERS string sPathSegment:="Seg1";
PERS speeddata vProgSpeed:=[500,500,500,500];
PERS num NumberOfScenes:=1;
PERS num NumberOfSegments:=7;
PERS string SceneList{MAX_SCENES}:=["S1","S2","NULL","NULL","NULL","NULL","NULL","NULL","NULL","NULL","NUL|
PERS string SceneSegment{MAX_SCENES,MAX_SEGMENTS}:=[["Seg1","Seg1","NULL","NULL","NULL","NULL","NULL","NUL|
                                                   ["Seg3","Seg4","NULL","NULL","NULL","NULL","NULL","NULL","|
                                                   ["NULL","NULL","NULL","NULL","NULL","NULL","NULL","NULL","|
PERS num SegmentTime{MAX_SCENES,MAX_SEGMENTS}:=[[19, 5.7,−1,−1,−1,−1,−1,−1,−1],
                                                [130.7,4.6,−1,−1,−1,−1,−1,−1,−1],
                                                [−1,−1,−1,−1,−1,−1,−1,−1,−1,−1],[−1,−1,−1,−1,−1,−1,−1,
```

The main module scans through the arrays and executes each subroutine in the segment calls, and here is an example of a main module.

```
FOR i FROM 1 TO NumberOfScenes DO
    IF SceneList{i}<>"NULL" THEN
        nCurrentScene:=i;
        sCurrentPath:=SceneList{i};
        NumberOfSegments:=SegmentCount(nCurrentScene);
        FOR y FROM 1 TO NumberOfSegments DO
            IF SceneSegment{i,y}<>"NULL" THEN
                nCurrentSegment;=y;
                sPathSegment:=SceneSegment{i,y};
                PulseDO\PLength:=0.5,doRobotReadData;
                PreSegment i,y ;
                sPathSegment ;
                PostSegment i,y ;
                Stop;
            ENDIF
        ENDFOR
    ENDIF
ENDFOR
```

Figure 5:
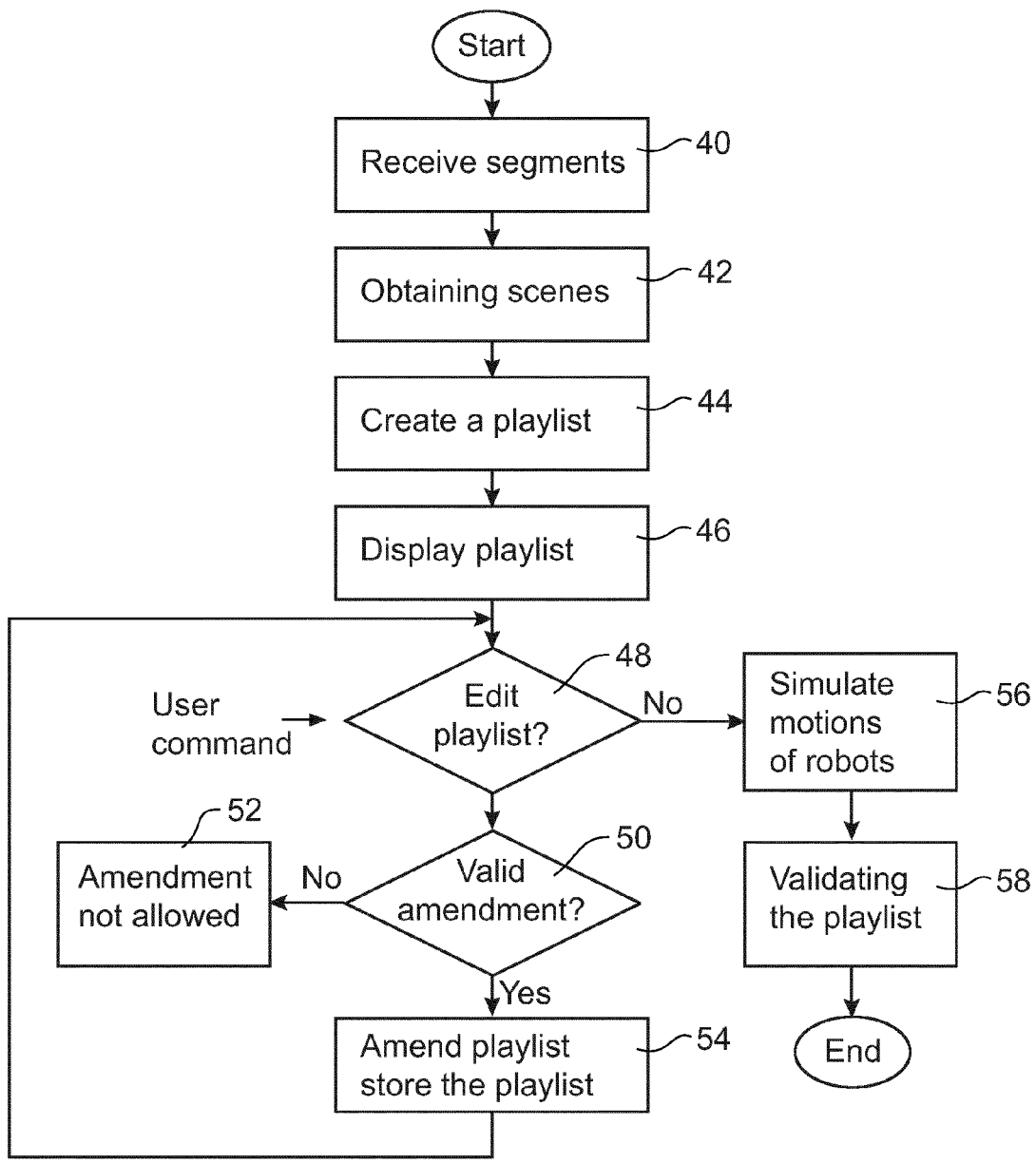
FIG. 5 shows a flow diagram of a method for editing and validating motions of a plurality of robots cooperatively performing a show according to an embodiment of the invention.

FIG. 5 shows a flow diagram of a method for editing and validating motions of a plurality of robots cooperatively performing a show according to an embodiment of the invention. It will be understood that each block of the flow chart can be implemented by computer program instructions.

The method comprises obtaining a plurality of segments that describe motions of the robots defined by animation software, each segment including a description of the motions of one of the robots during a defined time period, block 40. The plurality of segments can be obtained by receiving or retrieving the segments from the motion producing module 1. The segments are stored in a segment storage. The segments include information on which scene the segment belongs to and which robot the segment belongs to. For example, the names of the segments include information on which scene the segment belongs to, or each segment includes a scene identification tag including information on which scene the segment belongs to. For example, the names of the segments include information on which robot the segment belongs to, or each segment includes a robot identification tag including information on which robot the segment belongs to. A plurality of scenes is obtained based on the stored segments, block 42. The plurality of scenes can be obtained by receiving or retrieving the scenes from the motion producing module, or by creating the scenes based on the stored segments by means of the scene handler 4. Each scene includes a plurality of segments to be executed simultaneously by the robots. Information about the scenes, are stored, for example, in a scene storage as previously described.

A playlist including a sequence of scenes are obtained, block 44. The playlist can be created by the system as a default playlist or by the user. The user may create a new playlist by selecting scenes and add them to a sequence of scenes. The playlist is displayed on a user interface, block 46, and the user is allowed to edit the playlist by amending the sequence of scenes, block 48. The user interacts with the user interface during the editing of the playlist, and thereby generates commands regarding the amendments to the playlist. The system receives user commands regarding amendments.

Before amending the playlist, the amendment is checked to be valid, block 50. The amendment is validated based on the description of the motions of the robots of the segments included in the scenes in the amended part of the playlist. The amendment is allowed or denied based on the outcome of the validation. This is, for example, done by comparing the last position value in the previous segment with the first position value in the succeeding segment in the amended part of the playlist, and allowing the amendment if the last and first position values are equal or differs less than a limit value, block 52. If the amendment is valid, the playlist is amended based on the user commands. If the last and first position values differ more than the limit value, the amendment is not valid. If the amendment is found to not be valid, the amendment is not allowed and the user is informed accordingly, block 54. The validation steps 52-54 are optional. For example, if the segments are produced such that all segments have the same start and end positions, the validation check is not necessary. The user may repeat editing the playlist until he is satisfied with the playlist. The amended playlist is stored in a playlist storage, for example, in the playlist storage 7 previously described.

When the user has finished editing the playlist, the used has the option to select to simulate the motions of the robots as defined by the playlist. Alternatively, the simulation is not optional. The motions of the robots are simulated based on the playlist, the stored scenes, and segments, block 56. The playlist is validated based on the simulation, block 58. Thereafter, it is possible to determine whether the motions of the robots are collision free or not. For example, the simulated robot motions are displayed on the user interface and the user may determine visually whether the robot motions are collision free or not. Alternatively, the system determines whether the robot motions are collision free or not, and the user is informed accordingly. In another embodiment, the simulation step is omitted.

Figure 6:
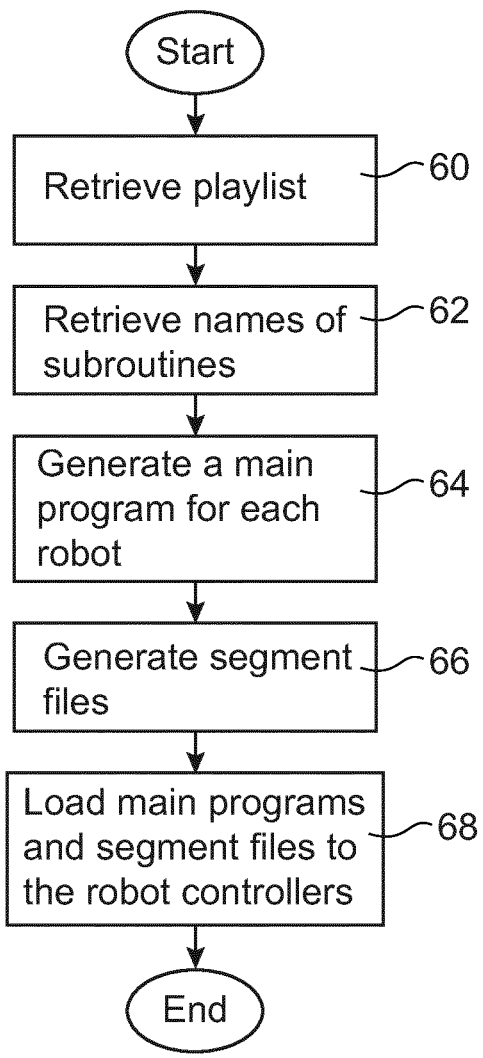
FIG. 6 shows a flow diagram of a method for generating main programs for a plurality of robots cooperatively performing a show according to an embodiment of the invention.

FIG. 6 shows a flow diagram of a method for generating main programs for a plurality of robots cooperatively performing a show according to an embodiment of the invention. When the user has finished editing of the playlist and the playlist has been validated, the user may command the system to start generation of main programs for the robots. Main programs for each of the robots are generated based on the playlist, the stored scenes and the stored segments. Each segment includes a subroutine comprising program code for carrying out the motions of the robot during the defined time period. Each subroutine has a subroutine name. The playlist is retrieved, block 60. A main program is generated for each robot by retrieving the names of the subroutines in the segments belonging to the robot for each scene in the playlist, block 62, 64. Each main program comprises a sequence of calls to subroutines included in segments belonging to the robot, and the order of the calls to the subroutines is determined by the order of the scenes in the playlist. A segment file is also generated for each robot, block 66. The segment file includes the segments belonging to the robot, or at least information from the segments belonging to the robot. At least, the segment file includes the positions of the robot and the program code of the segments.

When the main programs and segment files have been generated, the user may order automatic distribution of the main programs and segment files to selected robot controllers. Upon receiving an order from the user, the main programs and segment files are loaded to respective robot controller, block 68. Thus, each robot receives an associated main program and information from the segments belonging to the robot.

The scenes can be started by other actions without any operator input, such as time, I/Os, events or other triggers.

The present invention is not limited to the embodiments disclosed but may be varied and modified within the scope of the following claims. For example, the scene handler 4 may be included in the motion producer module 1. Then, the motion producer module 1 will directly output complete scenes.

The invention claimed is:

1. A system for creating and amending a playlist defining motions of a plurality of real robots cooperatively performing a show, and the system comprises:
   at least one storage for storing a plurality of segments that describe motions of the robots during the show, each segment includes a description of motions of one of the robots during a defined time period, which description comprises positions of the robot, and for storing a plurality of scenes, each scene specifying a plurality of segments to be executed simultaneously by the robots,
   a playlist handler configured to handle creation of a playlist including a sequence of scenes and to amend the playlist according to user commands,
   a user interface configured to display the playlist to a user, to allow the user to edit the playlist by amending the sequence of scenes, and to receive the user commands characterized in that said playlist handler is configured to receive a user command regarding an amendment to a part of the sequence of scenes, to validate the amendment based on said description of the motions of the robots of the segments included in the scenes in the amended part of the playlist, and to allow or deny the amendment based on the outcome of the validation, wherein the playlist handler is configured to compare positions belonging to the same robot of neighboring scenes in the amended part of the playlist and to validate the amendment based on the outcome of the comparison; and a plurality of real robots cooperatively performing the show.

2. The system according to claim 1, wherein each segment includes a start position and an end position for the robot, and the playlist handler is configured to validate an amendment by comparing start and end positions of segments belonging to the same robot of neighboring scenes in the amended part of the playlist, and to deny the amendment if the difference between the start and end positions of any of the segments of adjacent scenes exceeds a limit value.

3. The system according to claim 1, wherein the system comprises a scene handler configured to create a plurality of scenes based on the stored segments and to store the scenes in said storage.

4. The system according to claim 3, wherein each of said segments comprises information on which scene the segment belongs to, and the scene handler is configured to group the segments into a plurality of scenes based on the information on which scene the segment belongs to.

5. The system according to claim 1, wherein each of said segments comprises a robot identification tag including information on which robot the segment belongs to, and the playlist handler is configured to determine to which robot a segment belongs based on the robot identification tag.

6. The system according to claim 1, wherein the playlist handler is configured to simulate the motions of the robots based on the playlist, the stored scenes and the segments, and to validate the playlist based on the simulation.

7. The system according to claim 1, wherein each segment further includes program code for carrying out the motion of the robot during the defined time period, and the system further comprises a program generator configured to generate a main program for each of the robots based on the playlist, the stored scenes and the stored segments.

8. The system according to claim 7, wherein each segment includes a subroutine including said robot code and having a subroutine name to be called by the main programs, and the program generator is configured to generate a main program for each of the robots including a sequence of calls to said subroutines based on the playlist.

9. A method for creating and amending a playlist defining motions of a plurality of real robots cooperatively performing a show, wherein the method comprises:
   obtaining and storing a plurality of segments that describe motions of the robots during the show, each segment including a description of the motions of one of the robots during a defined time period, which description comprises a plurality of positions of the robot,
   obtaining a plurality of scenes, each scene including a plurality of said segments to be executed simultaneously by the robots, and
   creating a playlist including a sequence of said scenes, wherein the method further comprises:

displaying the playlist to a user and allow the user to edit the playlist by amending the sequence of scenes, receiving user commands regarding an amendment to a part of the sequence of scenes, comparing at least some of the positions belonging to the same robot of neighboring scenes in the amended part of the playlist, validating the amendment based on the outcome of the comparison, allowing or denying the amendment based on the outcome of the validation, amending the playlist based on the user commands if the amendment is allowed, storing the amended playlist, and cooperatively performing the show by the plurality of real robots.

10. The method according to claim 9, wherein each segment includes a start position and an end position for the robot, and the method comprises comparing start and end positions of segments belonging to the same robot of neighboring scenes in the amended part of the playlist, and to denying the amendment if the difference between the start and end positions of any of the segments of adjacent scenes exceeds a limit value.

11. The method according to claim 9, wherein the method comprises receiving a plurality of said segments, each of said segments comprises information on which scene the segment belongs to, creating said scenes based on the information on which scene the segment belongs, and storing the scenes.

12. The method according to claim 9 wherein each segment further includes program code for carrying out the motions of the robot during the defined time period, and the method further comprises generating a main program for each of the robots based on the playlist, the stored scenes and the stored segments.

* * * * *